US011747062B2

(12) United States Patent
Schnepf

(10) Patent No.: US 11,747,062 B2
(45) Date of Patent: Sep. 5, 2023

(54) VALVE CONTROL STATION

(71) Applicant: Preston Refrigeration Co. Inc., Kansas City, MO (US)

(72) Inventor: Brian Michael Schnepf, Shawnee, KS (US)

(73) Assignee: Preston Refrigeration Co. Inc., Kansas City, MO (US)

( * ) Notice: Subject to any disclaimer, the term of this patent is extended or adjusted under 35 U.S.C. 154(b) by 514 days.

(21) Appl. No.: 16/869,818

(22) Filed: May 8, 2020

(65) Prior Publication Data

US 2020/0355297 A1 Nov. 12, 2020

Related U.S. Application Data

(60) Provisional application No. 62/845,282, filed on May 8, 2019.

(51) Int. Cl.
*F16L 3/00* (2006.01)
*F25B 41/20* (2021.01)

(52) U.S. Cl.
CPC ............... *F25B 41/20* (2021.01); *F16L 3/00* (2013.01)

(58) Field of Classification Search
CPC ..... F16L 3/00; F16L 3/22; F16L 3/221; F16L 3/222; B65D 85/62; B65D 85/66; B65D 85/20; F66C 1/10; B65G 1/04; B65G 1/14; E21B 19/15
USPC .. 248/49, 62, 65, 70, 73, 74.1, 74.2, 80, 83, 248/85, 89; 52/646, 263, 220.1
See application file for complete search history.

(56) References Cited

U.S. PATENT DOCUMENTS

| | | | | |
|---|---|---|---|---|
| 3,787,016 A | * | 1/1974 | Laval, Jr. ................. | F16L 3/23 248/68.1 |
| 4,960,253 A | * | 10/1990 | Perrault ................ | H02G 3/263 248/68.1 |
| 6,061,984 A | * | 5/2000 | Rose ..................... | F16L 3/2431 52/646 |
| 9,032,677 B1 | * | 5/2015 | Zavitz .................... | E21B 19/15 52/294 |
| 9,296,559 B2 | * | 3/2016 | Nomura ................. | B65G 1/02 |
| 10,495,237 B1 | * | 12/2019 | Meyer .................... | F16L 3/221 |
| 2014/0183330 A1 | * | 7/2014 | Simmons ................ | G01B 3/14 249/49 |
| 2018/0162614 A1 | * | 6/2018 | Lu ........................ | B61D 45/008 |

FOREIGN PATENT DOCUMENTS

| | | | | | |
|---|---|---|---|---|---|
| GB | 2532350 A | * | 5/2016 | ............. | B65D 85/20 |
| KR | 1582480 B1 | * | 1/2016 | ................ | F16L 3/08 |

\* cited by examiner

*Primary Examiner* — Patrick F Brinson
(74) *Attorney, Agent, or Firm* — Spencer Fane LLP

(57) ABSTRACT

A support structure for a valve module of a refrigeration system includes a support structure that can be supported on the roof or floor of a building by adjustable legs, or can be suspended from the ceiling of a building. The support structure has cross members allowing the components of a valve module to be pre-assembled thereon and transported as a valve control station to an installation location. The pipes of the pre-assembled valve control station can be aligned with pipes laid out at the installation location, thereby allowing off-site fabrication of a valve control station for a refrigeration system.

10 Claims, 3 Drawing Sheets

VALVE CONTROL STATION

CROSS-REFERENCE TO RELATED APPLICATIONS

This application claims priority in U.S. Provisional Patent Application Ser. No. 62/845,282, filed May 8, 2019, the contents of which are hereby incorporated by reference.

BACKGROUND

1. Field of the Disclosed Subject Matter

Fluid control systems, and components thereof, in particular, refrigeration systems.

2. Background

Assembly of fluid control systems for large scale refrigeration systems is traditionally done on-site, and is inefficient, and leads to inconsistent design, manufacturing, and results.

SUMMARY

The disclosed subject matter includes a support structure for a valve module of a refrigeration system, with a first support formed by a first cross member support adjacent a second cross member support, and a plurality of legs depending from the first support for supporting the first support on a surface. The support structure can further include a second support formed by an upper cross member adjacent a lower cross member, a third support formed by an upper cross member adjacent a lower cross member, with the second support and third support disposed adjacent to each other. Legs can be connected to the first support for suspending the support structure above a surface. A light depending from the upper cross members illuminate the valve module. The pipe assemblies of the valve module extend across the cross member supports.

Further, the disclosed subject matter includes a support structure for a valve module of a refrigeration system, with a first support formed by a first cross member support joined to an adjacent second cross member support by a first side member and an adjacent second side member, and a plurality of legs depending from the first support for supporting the first support on a surface. The support structure can further include a second support formed by an upper cross member joined to a lower cross member by a first side member and an adjacent second side member, and a third support formed by an upper cross member joined to a lower cross member by a first side member and an adjacent second side member, with the second support and third support disposed adjacent to each other. Legs can be connected to second support side members and third support side members for suspending the support structure above a surface. The legs can include a foot for supporting the support structure on a surface. The first support first side member can be joined with the second support first side member and third support first side member, and the first support second side member can be joined with the second support second side member and third support second side member forming an integrated support structure. The pipe assemblies of the valve module extend across the cross member supports.

Further, the disclosed subject matter includes a support structure for a valve module of a refrigeration system, with a first support formed by a first cross member support joined to an adjacent second cross member support by a first side member and an adjacent second side member, a second support formed by an upper cross member joined to a lower cross member by a first side member and an adjacent second side member, and a third support formed by an upper cross member joined to a lower cross member by a first side member and an adjacent second side member. The first support first side member intersects and is joined with the second support first side member and third support first side member, and the first support second side member intersects and is joined with the second support second side member and third support second side member. A condensate pan disposed below the first support catches condensate that might collect and fall from the valve module. The pipe assemblies of the valve module extend across the cross member supports.

BRIEF DESCRIPTION OF THE DRAWINGS

The present disclosed subject matter is described herein with reference to the following drawing figures, with greater emphasis being placed on clarity rather than scale.

DETAILED DESCRIPTION

Figure 1:
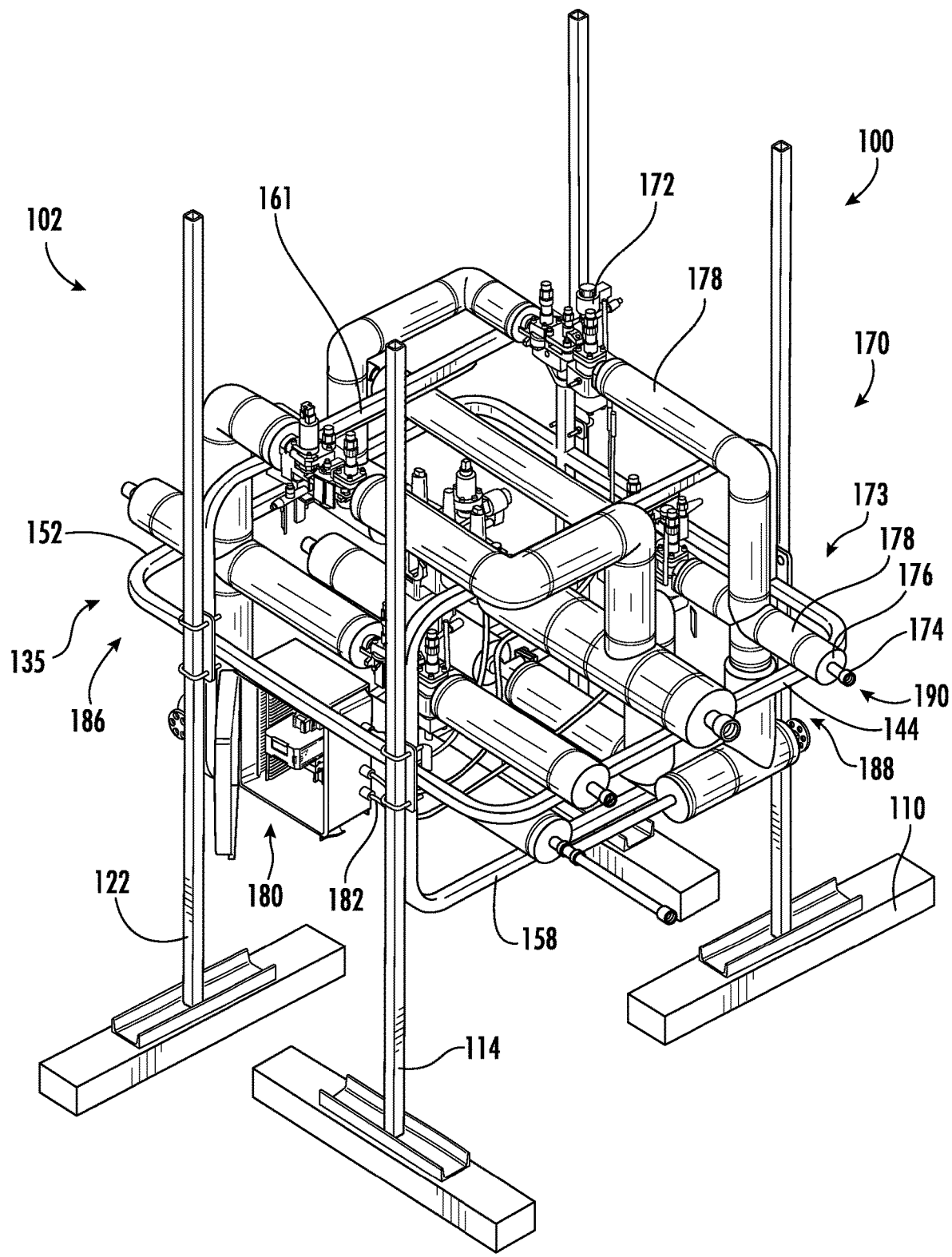
FIG. 1 is an isometric view from above of a control station assembly embodying aspects of the disclosed subject matter.
Figure 2:
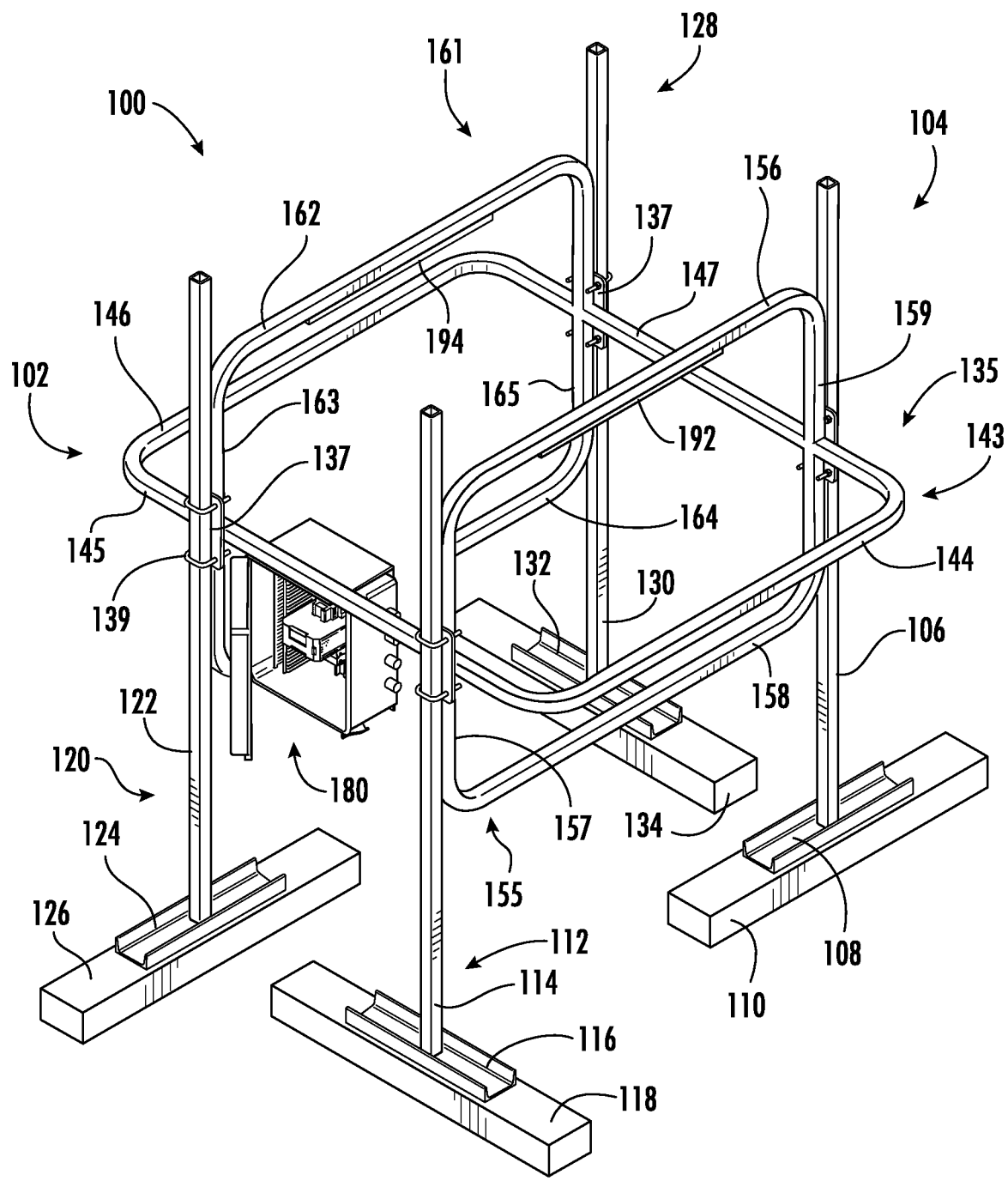
FIG. 2 is an isometric view from above of the frame assembly embodying aspects of the disclosed subject matter.
Figure 3:
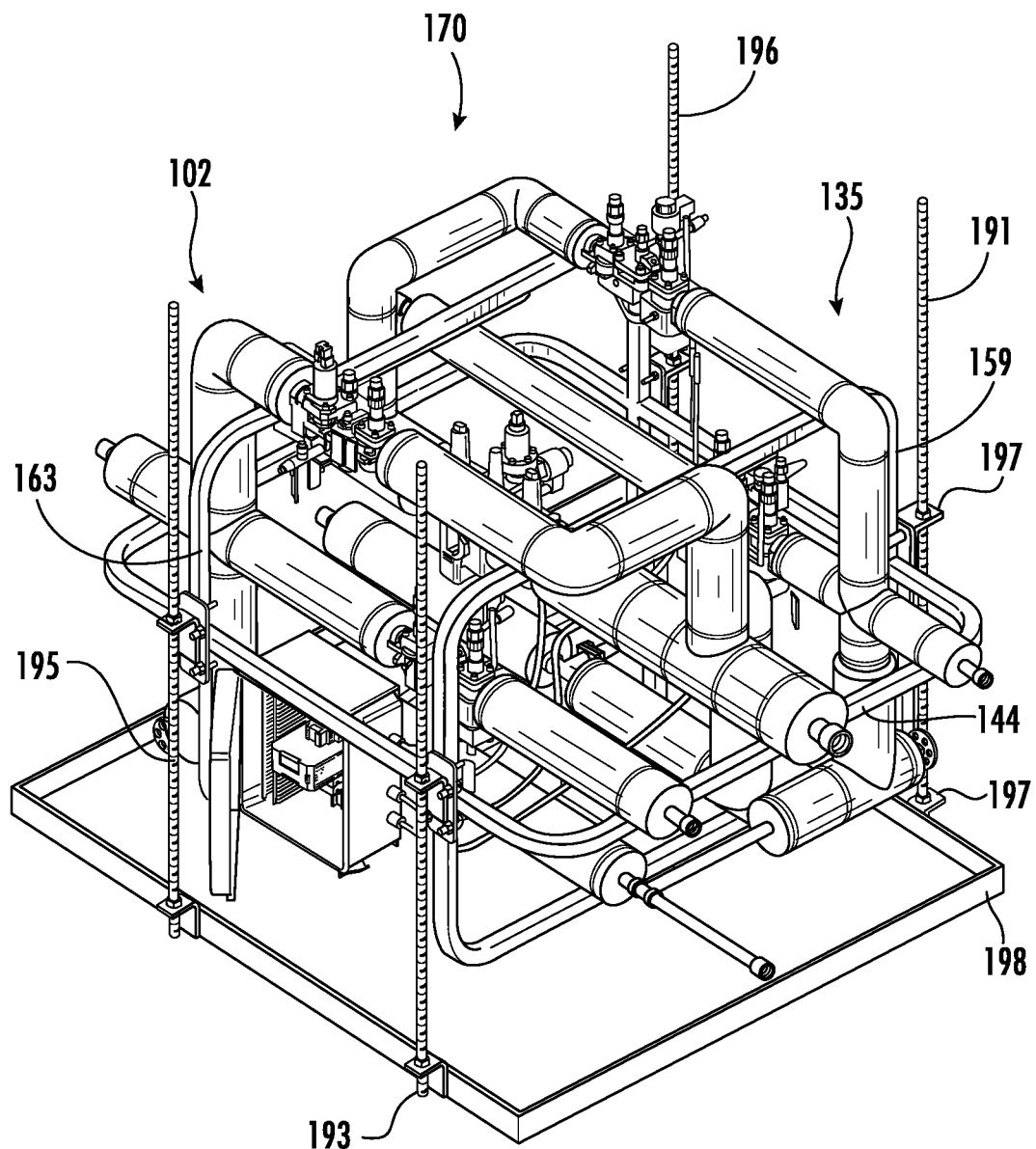
FIG. 3 is an isometric view from above of a suspended frame assembly embodying aspects of the disclosed subject matter.

Referring to FIGS. 1-3, an embodiment of a control station assembly 100 is shown and described. The control station assembly includes a valve module 170 mounted to a frame assembly 102. The control station assembly 100 is used to control movement of a fluid in a fluid control system.

The frame assembly 102 includes a support structure 135 with adjustable legs. In an implementation, the components of the frame assembly 102 are metal, including, for example, galvanized steel. The support structure 135 provides a support and attachment point for the valve module 170. The adjustable legs allow the frame assembly 102 to be positioned at an installation location, such as the roof of a building, allowing adjustment of the support structure 135 so that the valve module 170 can be aligned with pipe connections to be made at the installation location, or pipe connections pre-existing at the installation location.

Referring to FIGS. 1-2, an implementation of the support structure 135 is formed from a first support 143, a second support 155, and third support 161. The first support 143 is formed by a first cross member support 144 joined to an adjacent second cross member support 146 by a first side member 145 and adjacent second side member 147. The second support 155 is formed by an upper cross member 156 joined to an adjacent lower cross member 158 by a first side member 157 and an adjacent second side member 159. The third support 161 is formed by an upper cross member 162 joined to an adjacent lower cross member 164 by a first side member 162 and second side member 165. The second support 155 and third support 161 are disposed adjacent to each other whereby upper cross members 156, 162 are disposed adjacent, and the lower cross members 158, 164 are disposed adjacent. In an implementation the first, second, and third supports 143, 155, and 161 form ring structures. In an aspect the cross member supports 144, 146 have brackets 152 for supporting the various pipe assemblies 173 connected to valves 172. Optionally, the support structure 135 includes a first light 192 depending from upper cross member 156, and a second light 192 depending from upper cross member 162 for illuminating the valve module 170.

In an implementation, the first, second, and third supports 143, 155, and 161 are joined, such as shown in FIG. 2, whereby the first support 143 first side member 145 intersects and is joined with the second support 155 first side member 157 and third support 161 first side member 163, and the first support 143 second side member 147 intersects and is joined with the second support 155 second side member 159 and third support 161 second side member 165.

The supports 143, 155, and 161 are connected to a plurality of legs that are adjustable relative to the support structure 135. A first leg 104 is adjacent the second support 155 second side member 159, and a second leg 112 is adjacent the second support 155 first side member 157 opposite the first leg 104. The first leg 104 has an upright 106 terminating in a foot 108, and the second leg 112 has an upright 114 terminating in a foot 116. A third leg 120 is adjacent the third support 161 first side member 163, and a fourth leg 128 is adjacent the third support 161 second side member 165 opposite the third leg 120. The third leg 120 has an upright 122 terminating in a foot 124, and the fourth leg 128 has an upright 130 terminating in a foot 132. The foot 108, 116, 124, and 132 components support the frame assembly 102 on a surface at the installation location, such as a roof of a building. In an implementation, the foot 108, 116, 124, 132 components include shoes 110, 118, 126, 134, respectively. In an implementation, the shoes are formed from cellulose materials, such as composite timbers, allowing further distribution of weight of the control station assembly 100 upon the surface of the installation location and prevents the foot 108, 116, 124, 132 components from compromising the surface of the installation location, such as what might occur when the foots are metal, and/or when the surface is roofing material, such as a membrane roof.

In an implementation, the legs 104, 112, 120, and 128 are slideably connected to the support structure 135. In such an implementation, the side members of the second and third supports 155, 161 form guide structures. In an implementation, the second support 155 side members form tubes that slideably receive uprights of the associated legs, and the third support 161 side members form tubes that slideably receive uprights of the associated legs.

The support structure 135 can be connected to the uprights, with removable fasteners or by welding, after the support structure 135 is in the desired position at the installation location. In an implementation, the support structure 135 is connected to the uprights by U-bolts 139 passing through a mounting plate 137 connected to the support structure, and secured by bolts. The U-bolts 139 allow adjustment of the support structure 135 above the surface allowing alignment of the pipes 174 with pre-existing pipes at the installation location. The mounting plates 137 can be welded or fastened to the support structure 135. The mounting plates 137 can be connected to the first support 143, the second support 155, third support 161, or at the junction of the supports 143, 155, 161 as shown in FIG. 1.

An exemplary valve module 170 is shown and described as a variety of valves 172, pipe assemblies 173, and arrangement of valves 172 and pipe assemblies 173 can be used with the frame assembly 102. The pipe assemblies 173 include a pipe 174 surrounded by insulation 176, with protective jacketing 178 surrounding the insulation 176. In an implementation, the pipe 174 is metal. In the exemplary valve module 170, the module is arranged to form an in-line connection to three pipe lines.

The first line 186 has a pipe assembly 173 that extends through the frame assembly 102 across the first cross member support 144 and second cross member support 146, with an in-line valve 172 disposed between the cross member supports. The first line 186 is connected to a first lower bypass line below, and a first upper bypass line above. The first lower bypass has a pipe assembly 173 that extends from the first line 186, through the frame assembly 102 across lower cross member 158 and lower cross member 164, terminating at an outlet. The first upper bypass has a pipe assembly 173 that extends from the first line 186, through the frame assembly 102 across upper cross member 156 and upper cross member 162, with an in-line valve 172 disposed between the cross members, and terminates connected to the second line 188.

The second line 188 has a pipe assembly 173 that extends through the frame assembly 102 across the first cross member support 144 and second cross member support 146, with an in-line valve 172 disposed between the cross members supports. The second line 188 is connected to a second lower bypass line below, and a second upper bypass line above. The second lower bypass has a pipe assembly 173 that extends from the second line 188, through the frame assembly 102 across lower cross member 158 and lower cross member 164, with an in-line valve 172 disposed between the cross members, terminating at an outlet. The second upper bypass line has a pipe assembly 173 that extends from the second line 188, through the frame assembly 102 across upper cross member 156 and upper cross member 162, with an in-line valve 172 disposed between the cross members, and terminates connected to the third line 190.

The third line 190 has a pipe assembly 173 that extends through the frame assembly 102 across the first cross member support 144 and second cross member support 146, with an in-line valve 172 disposed between the cross member supports. The pipe assemblies 173 of the valve module 170 are supported by the brackets 152. The third lower bypass has a pipe assembly 173 that extends from the third line 190, terminating in a connection to the first lower bypass.

The valves 172 are connected by control wires 182 to a junction box 180 connected to support structure 135 thereby allowing the valve module 170 to be adjusted as a unit to level the module 170 and align and connect the open ends of the pipe assemblies 173 in-line to the various lines present at the installation location.

The valve module 170 can be designed and the control station assembly 100 can be fabricated in a controlled manufacturing environment to allow precise and consistent fabrication, assembly, tagging, and labeling of the valve module 170 and its components. Wiring the valves 172 to the junction box 180 allows the valve module 170 to be easily integrated with various existing or custom designed wiring arrangements. Additionally, pre-fabrication of the valve module 170 and mounting of the module 170 to the frame assembly 102 reduces overall installation time and costs, and reduces the number of connections or welds necessary at the installation location.

Referring to FIG. 3, in an implementation of the disclosed subject matter, the support structure 135 and valve module 170 are arranged for suspension from a support structure, such as the ceiling of a building. A first support member 191 is adjacent second side member 159, a second support member 193 is adjacent side member 157 opposite the first support member 191. A third support member 195 is adjacent first side member 163, and a fourth support member 196 second side member 165 opposite the third support member 163. The support members 191, 193, 195, 196 are connected to the mounting plates 137 by tabs. The support members extend through the tabs 197 and support a condensate pan 198 below the valve module 170.

In an implementation, the valve module 170 and its components are adapted for use in refrigeration systems, such as a refrigeration system utilizing ammonia.

As required, detailed aspects of the present disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art to variously employ the present disclosed subject matter in virtually any appropriately detailed structure.

Although the subject matter has been disclosed with reference to various particular embodiments, it is understood that equivalents may be employed and substitutions made herein without departing from the scope of the disclosed subject matter.

Having described the disclosed subject matter, what is claimed as new and desired to be secured by Letters Patent is:

1. A support structure for a valve module, comprising:
   a first support formed by a first cross member support adjacent a second cross member support;
   a plurality of legs depending from the first support for supporting the first support on a surface;
   a second support formed by an upper cross member adjacent a lower cross member;
   a third support formed by an upper cross member adjacent a lower cross member;
   wherein the second support and third support are disposed adjacent to each other; and
   a first light depending from upper cross member, and a second light depending from upper cross member for illuminating the valve module.

2. The support structure of claim 1, wherein the legs are connected to the first support.

3. The support structure of claim 1, wherein a pipe assembly extends across the first cross member support and second cross member support.

4. A support structure for a valve module, comprising:
   a first support formed by a first cross member support joined to an adjacent second cross member support by a first side member and an adjacent second side member;
   a plurality of legs depending from the first support for supporting the first support on a surface;
   a second support formed by an upper cross member joined to a lower cross member by a first side member and an adjacent second side member;
   a third support formed by an upper cross member joined to a lower cross member by a first side member and an adjacent second side member; and
   wherein the second support and third support are disposed adjacent to each other.

5. The support structure of claim 4, wherein the legs are connected to second support side members and third support side members.

6. The support structure of claim 5, wherein:
   the first support first side member is joined with the second support first side member and third support first side member; and
   the first support second side member is joined with the second support second side member and third support second side member.

7. The support structure of claim 5, wherein the legs include a foot for supporting the support structure on a surface.

8. A support structure for a valve module, comprising:
   a first support formed by a first cross member support joined to an adjacent second cross member support by a first side member and an adjacent second side member;
   a second support formed by an upper cross member joined to a lower cross member by a first side member and an adjacent second side member;
   a third support formed by an upper cross member joined to a lower cross member by a first side member and an adjacent second side member;
   wherein the first support first side member intersects and is joined with the second support first side member and third support first side member; and
   wherein the first support second side member intersects and is joined with the second support second side member and third support second side member.

9. The support structure of claim 8, further comprising:
   a condensate pan disposed below the first support.

10. The support structure of claim 8, wherein a pipe assembly extends across the first cross member support and second cross member support.

* * * * *